United States Patent [19]

Jurek

[11] 4,452,371

[45] Jun. 5, 1984

[54] TAMPER-RESISTANT EQUIPMENT HOUSING

[75] Inventor: Richard D. Jurek, Lakeville, Minn.

[73] Assignee: Air-Vend, Inc., Eden Prairie, Minn.

[21] Appl. No.: 514,299

[22] Filed: Jul. 15, 1983

[51] Int. Cl.³ .............................................. B65D 45/00
[52] U.S. Cl. .................................................... 220/315
[58] Field of Search ......................... 220/315, 210, 323

[56] References Cited

U.S. PATENT DOCUMENTS 2,875,918  3/1959  Baumier .............................. 220/323
3,315,023  4/1967  Davis ................................... 220/315

*Primary Examiner*—George T. Hall
*Attorney, Agent, or Firm*—Orrin M. Haugen; Thomas J. Nikolai; Douglas L. Tschida

[57] ABSTRACT

A tamper-resistant housing for padlocked vending equipment, wherein a plurality of formed metal loops are welded to the interior housing in an alignment for containing a slide-bar mounted through slots in the exterior of the housing. The housing is partially recessed interiorly so as to shelter the lock containing end of the slide bar and the related padlock. Additional housing support is obtained via strength enhancing ribs formed in the back thereof.

5 Claims, 3 Drawing Figures

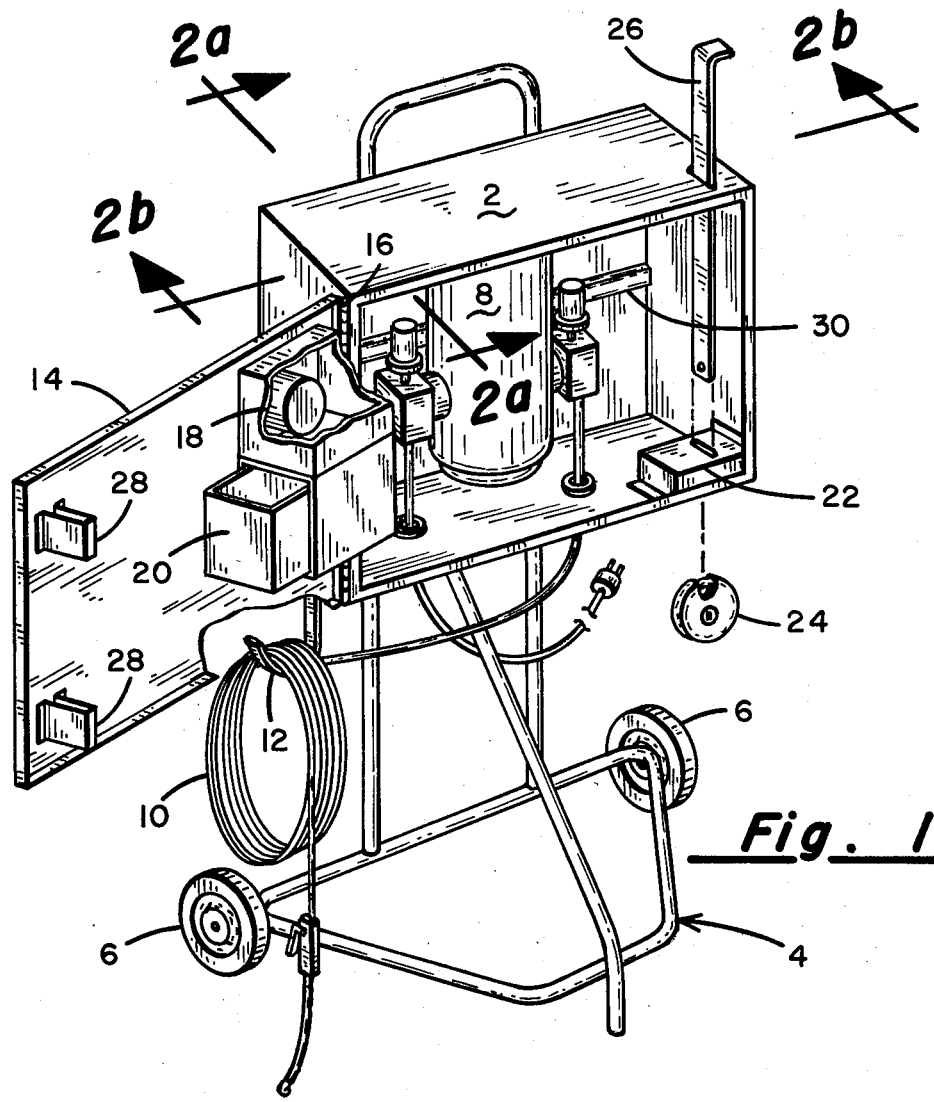
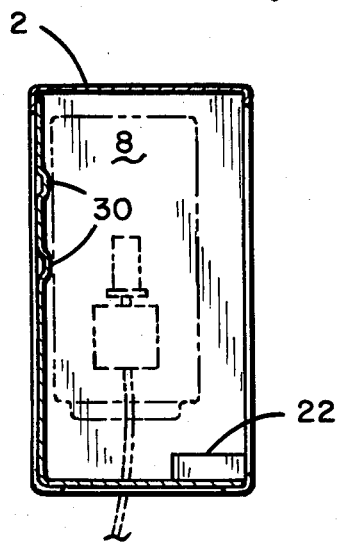
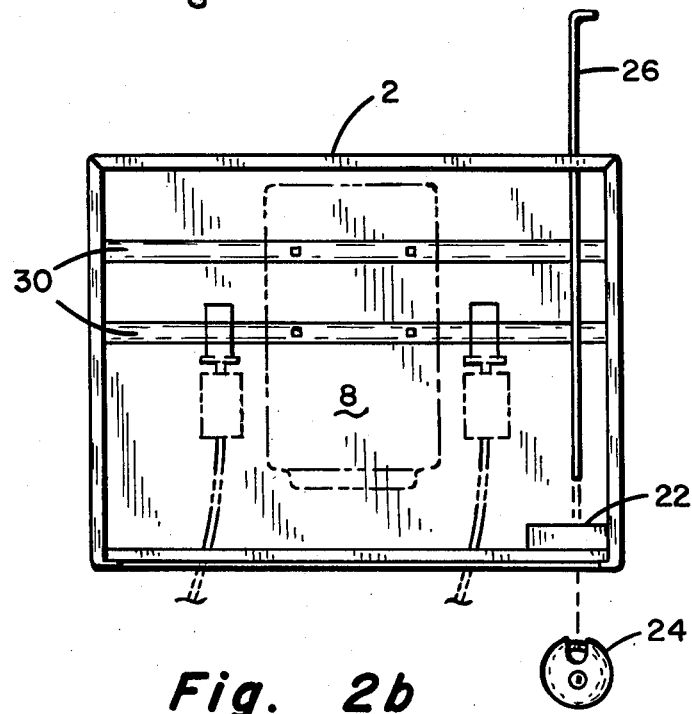
Fig. 1
Fig. 2a
Fig. 2b

TAMPER-RESISTANT EQUIPMENT HOUSING

BACKGROUND OF THE INVENTION

The present invention relates to equipment housings in and particular to a sheet metal housing for service station or automotive related vending equipment, such as for the delivery of air, water or self-sevice vacuum cleaning.

As the profit margins have shrunk in the service station industry and as the industry has evolved toward a self-service operations and full-service operations, a need has been created for vending equipment offering air, water or vacuum cleaning services to the average customer. While heretofore such services were commonly offered free of charge in a full-service operation, the cost thereof was typically made up for in higher priced fuel and services. However, because the cost for providing such services, due to lost time, has increased and because many operations are now self-service oriented (with attendant lower profit margins), it becomes much less economical for a service station operator to provide these services, free of charge.

Rather, it is more advantageous for the operator to make available these services to his customers via self-service vending equipment and for which a nominal charge is made. In the past, such vending equipment often was mostly encountered in car wash situations relative to vacuum cleaning, but now it has become economically advantageous to offer it in a wider spectrum of services and to a wider variety of operations. An example, too, of related air dispensing equipment can be found upon reference to U.S. Pat. No. 4,289,255.

As always, though, with any vending equipment that remains unattended for any length of time, the risk of vandalism is increased. Accordingly, it is desirable to surround such equipment with a tamperproof housing so as to discourage vandalism. While such housings can be extremely elaborate in their deterent mechanisms, the cost thereof can also become prohibitive, thus extending the payback period for the equipment, and therefore a need exists for a low-cost enclosure that delays entry, but during which delay the vandal can be detected.

It is therefore, a primary object of the present invention to disclose an economical, tamper-resistant housing which adaptively may be made to enclose such equipment in a fashion that will discourage vandalism.

It is a further object to employ redundant locking systems within such housing so as to separately lock the housing and equipment contents from the coin meter and coin vault.

The above objects and advantages of the present equipment as well as various others will, however, become more apparent upon a reading of the following disclosure with respect to the following drawings. Before turning attention thereto, though, it is to be recognized that while the present invention is described with respect to its presently preferred embodiment, various modifications and/or changes may be made thereto without departing from the spirit and scope of the present invention.

BRIEF DESCRIPTION OF THE DRAWINGS

FIG. 1 shows a partially cutaway perspective view of a typical coin operated, portable air delivery vending unit.

FIG. 2a shows a cross sectional view taken along lines 2a—2a of FIG. 1.

FIG. 2b shows a front view of the enclosure taken along lines 2b—2b of FIG. 1 without the air compressor.

SUMMARY OF THE INVENTION

An improved tamper-reistant housing for vending equipment comprising a multi-sectioned sheet metal enclosure having strengthening and vibration dampening ribs formed in the back skin and plurality of door mounted metallic loops for mating with a steel slide-bar mounted therethrough. The enclosure is also provided with a recessed space wherein the padlock is enclosed and the slide-bar terminated, thus increasing the degree of difficulty for the vandal. A redundant padlocked coin container is also contained within the enclosure.

DESCRIPTION OF THE PREFERRED EMBODIMENT

Referring to FIG. 1, a perspective view is shown of the present invention as it relates to a portable vending apparatus for metering air to automobile tires or the like. The apparatus is essentially comprised of an equipment housing 2 that is portably mounted to a tubular display stand 4 and which has a pair of side mounted wheels 6. An air compressor 8 is mounted internally to the back of the unit and a length of air hose 10 is mounted to the housing via a side mounted hook 12. The door 14 to the housing 2 is, in turn, mounted thereto via a piano hinge 16 that is weldably secured to the door 14 and one side of the housing 2. A coin meter 18 and padlocked coin box or vault 20 are mounted to the inside surface of the door 14. Thus, for a vandal to get to the money, it is necessary to first break into the housing 2 and then separately into the coin box.

In regards to entry into the housing 2, a padlock has heretofore been employed with a slide bar that lockably secures the door 14 to the housing 2, but wherein the padlock was exposed to bolt cutters, hacksaws or the like and which resulted in an occasional successful vandalism. The present invention, therefore, comprises the appropriate modification to the housing 2 so as to create a recessed space within which the padlock may be conveniently secured to a shortened slide bar assembly so as to conveniently permit authorized access to the padlock, yet discourage and minimize the mechanical advantage that might be obtained via the enclosure shape, such as where a pry bar, bolt cutters or the like is employed. As a further part of the present invention, a multiple sectioned cabinet skin having ribbed stiffeners formed in the back thereof is used and which minimizes the liklihood of cutting an opening into the enclosure; and which is also in any case minimized due to the use of 14 gauge steel in the metal enclosure. Thus, the back and bottom form one section, while the top, front and two sides form another and the door forms a third section. The exposed edges are bent so as to be apparent only at the back and bottom with the skin sections overlapping one another three-fourths of an inch. The skin sections are also welded in the regions of the overlap.

With respect to the improved slide bar assembly, it is to be noted from FIG. 1 that an opening is cut in the bottom of the enclosure 2 and wherein a separately formed recessed housing 22 is inserted and welded to the enclosure 2 so as to create a hollow recess wherein the padlock 24 may be contained and thus not be accessible to vandalism attempts.

The slide bar 26, on the other hand, is fabricated from ¼×1½ inch stainless steel flat stock that is bent 90° at its upper end so as to lie flat against the top of the enclosure 2, when it is fully mounted in the enclosure. The bar 26 in this position, mates with a number of metal loops 28 that are weldably secured to the sides of the door 14. Depending upon the equipment type and the enclosure size more or less of such metal loops are employed and through which the bar 26 extends so as to in essence create a draw bar which cannot be removed from the enclosure, due to the upper bend and the padlock 24. It should be noted, too, that due to the narrow radius of bend, the shortness of the bent section of the bar 26 and the flat mounting, it would be extremely difficult to staighten the bar or cut the bend off so as to permit its removal, other than by unlocking the padlock. As importantly, it should be recalled that the present assembly while being tamper resistant, is only such for a period of time and thus in a partially tended self-service station environment, the time it takes to defeat the assembly is typically much greater than that wherein the tampering activity would remain unnoticed. Thus, the present assembly greatly minimizes the liklihood of a successful theft.

Drawing attention next to FIG. 2a, a partially sectioned side view is shown of the present assembly relative to its multiple skin sections and the use of strengthening ribs in the back thereof. Specifically, the back of the enclosure 2 is stamped in a separate operation so as to form the ribs 30 without stretching the metal and which places stress in the ribs and thereby strengthens the back. The ribs also add mounting support for the mounting of the compressor 8 and damper vibration.

From FIG. 2b, it can also be seen that these ribs 30 extend the full width of the back and are rectangular in shape, although various other types of ribs (i.e. V ribs or the like) may also be advantageously employed. The effect of the ribs 30, though, is to add structural support, particularly at the compressor mounting side, although such a ribbed skin can be used for any of the sides so as to prevent against puncture as by chisels or the like. As mentioned, though, the intent of the present enclosure is to be used in a nominally monitored location and thus detection time would typically be shorter than the time to break into the enclosure. Also, it is expected that the coins maintained in the enclosure would be kept to a minimum, even though the coin box can be sized either at a $250 or a $750 capacity.

While the present invention has been described with respect to its present preferred embodiment, it is to be recognized that numerous modifications can be made thereto, such as by the use of additional ribbed skins, deleting the air louvers, changing the lock type and the shape of the recess, among others. It is, therefore, contemplated that the following claims will be interpreted so as to include those equivalent structures within the spirit and scope of the following claims.

What is claimed is:

1. A tamper-resistant enclosure comprising:
 (a) a formed enclosure fabricated to have at least one hingeable side for permitting access to the interior thereof;
 (b) a locking bar extendable through said enclosure through a plurality of formed loops mounted therein such that said locking bar is contained within said loops so as to prevent the opening of said hinged side; and
 (c) said enclosure having a recessed portion formed therein such that one end of said locking bar extends into said recess and whereat lock means secure said locking bar against withdrawal and whereby said lock means remains substantially protected from external vandalism.

2. Apparatus as set forth in claim 1 wherein at least one side of said enclosure has a plurality of strengthening ribs stamped therein for added structural support and tamper resistance.

3. Apparatus as set forth in claim 2 wherein said additional skin includes a plurality of strengthening ribs are half-rectangular shaped in cross section.

4. Apparatus as set forth in claim 2 wherein said strengthening ribs are V-shaped in cross section.

5. A locking assembly for a tamper-resistant enclosure comprising:
 (a) a lock bar;
 (b) a plurality of loops mounted to an inside surface for hinged side of said enclosure for receiving said locking bar;
 (c) a lock;
 (d) a recess formed in said enclosure and having a hole therein and in an opposed side for receiving one end of said lock bar such that said lock may be attached thereto and whereby said remains substantially unexposed to potential vandalism.

* * * * *

UNITED STATES PATENT AND TRADEMARK OFFICE
CERTIFICATE OF CORRECTION

PATENT NO. : 4,452,371

DATED : June 5, 1984

INVENTOR(S) : Richard D. Jurek

It is certified that error appears in the above—identified patent and that said Letters Patent are hereby corrected as shown below:

Column 4, Line 42, "for" should read -- of a --.

Signed and Sealed this

Ninth Day of October 1984

[SEAL]

Attest:

Attesting Officer

GERALD J. MOSSINGHOFF

Commissioner of Patents and Trademarks